United States Patent
Liang Lim et al.

(10) Patent No.: US 6,570,391 B2
(45) Date of Patent: May 27, 2003

(54) CARTRIDGE SCREENING METHOD WITH PIN-POINT CAPABILITIES ON THE CAUSES OF DEFECTS

(75) Inventors: Bernard Tuang Liang Lim, Singapore (SG); Sheng Jau Wong, Singapore (SG); Myint Ngwe, Singapore (SG); Kah Liang Gan, Singapore (SG); Victor Wengkhin Chew, Singapore (SG); Eng Hock Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/815,687

(22) Filed: Mar. 23, 2001

(65) Prior Publication Data

US 2001/0045823 A1 Nov. 29, 2001

Related U.S. Application Data

(60) Provisional application No. 60/193,684, filed on Mar. 31, 2000.

(51) Int. Cl.[7] .......................... G01R 31/08; G01R 33/12
(52) U.S. Cl. ......................................... 324/525; 324/212
(58) Field of Search ................................ 324/699, 212, 324/525, 537, 546, 210, 213; 360/67, 294

(56) References Cited

U.S. PATENT DOCUMENTS

| | | | |
|---|---|---|---|
| 4,532,802 A | 8/1985 | Yeack-Scranton et al. | |
| 4,949,036 A | * 8/1990 | Bezinque et al. | ........... 324/212 |
| 5,134,366 A | 7/1992 | Kirk | |
| 5,508,614 A | 4/1996 | Garfunkel et al. | |
| 5,589,771 A | 12/1996 | Chur | |
| 5,589,777 A | 12/1996 | Davis et al. | |
| 5,721,488 A | 2/1998 | Sakai et al. | |
| 5,821,746 A | 10/1998 | Shelor | |
| 6,060,887 A | 5/2000 | Nakamura et al. | |
| 6,320,714 B1 | * 11/2001 | Moon et al. | ................. 324/212 |

* cited by examiner

Primary Examiner—Christine Oda
Assistant Examiner—James Kerveros
(74) Attorney, Agent, or Firm—Mitchell K. McCarthy (57) ABSTRACT

A method of manufacturing disc drives. Before a pivot cartridge is assembled into a disc drive, impedance readings of the pivot cartridge are taken, preferably, at more than one rotational position and across a frequency range. The pivot cartridge is accepted for assembly into the disc drive only if its impedance readings compare favorably with readings taken of a good pivot cartridge. Otherwise, the pivot cartridge is rejected and the impedance readings are analyzed to provide identification of the defect in the pivot cartridge. In addition, a system and a storage device readable by a computer system for implementing the method of screening pivot cartridges and identifying causes of defects is provided.

11 Claims, 11 Drawing Sheets

CARTRIDGE SCREENING METHOD WITH PIN-POINT CAPABILITIES ON THE CAUSES OF DEFECTS

The present application claims benefit from the U.S. Provisional Application No. 60/193,684 filed Mar. 31, 2000.

FIELD OF THE INVENTION

The present invention relates generally to the manufacture of disc drives. More particularly, the present invention relates to a method of manufacturing disc drives with improved bits error rate.

BACKGROUND OF THE INVENTION

Disc drives perform write, read, and servo operations when storing and retrieving data. Generally, a write operation includes receiving data from a host system and storing the data in the random access memory (RAM). The microprocessor schedules a series of events to allow the information to be transferred from the RAM to the discs through the write channel. Before the data is transferred, the read/write heads are positioned on the appropriate track and the appropriate sector of the track is located. The data from the RAM is then communicated to the write channel as a digital write signal. The preamplifier processes the digital write signal coming from the write channel and generates a write current to the appropriate writer.

In a read operation, the appropriate sector to be read is located and data that has been previously written to the discs is read. The appropriate reader senses the changes in the magnetic flux and generates a corresponding analog read signal. The analog read signal is provided back to the electronic circuitry where the pre-amplifier amplifies the analog read signal. The amplified analog read signal is then provided to the read channel where the read channel conditions the signal and detects "zeros" and "ones" from the signal to generate a digital read signal. The digital read signal is then transferred from the read channel and is stored in the RAM. The microprocessor may then communicate to the host system that data is ready to be transferred.

Electrical noise is often present in the read/write signals. More specifically, noise is coupled into the analog read signal during read operations between the reader and the read pre-amplifier, and between the read pre-amplifier and the read channel. For example, any noise that is coupled into the read path will be amplified by the read pre-amplifier. Similarly, noise is introduced into the write path. Overall, this results in a decrease in the signal-to-noise ratio (SNR) and decrease in bit error rate (BER).

Disc drive manufacturers strive to provide drives that operate at a high SNR and a good BER. Traditionally, the BER performance is obtained after assembly to assess whether the disc drive meets predetermined standards. The cost of rejecting a disc drive at such a late stage of the manufacturing process is high, but deemed inevitable since only an assembled disc drive can be used to produce the BER which is used for assessing the SNR characteristics of the disc drive.

There is therefore a need for an improved method of screening defective disc drives at lower cost to the manufacturer. The following describes how the present invention provides this and other advantages over the prior art.

SUMMARY OF THE INVENTION

The present invention relates to a method of manufacturing disc drives which provides an improved solution to the above-mentioned problem.

In accordance with one embodiment of the invention, before a pivot cartridge is assembled into a disc drive, impedance readings of the pivot cartridge are taken, preferably, at more than one rotational position and across a frequency range. The pivot cartridge is accepted for assembly into the disc drive only if its impedance readings compare favorably with readings taken of a good pivot cartridge. Otherwise, the pivot cartridge is rejected and the impedance readings are analyzed to provide identification of the defect in the pivot cartridge.

The present invention also can be implemented as a computer-readable program storage device which tangibly embodies a program of instructions executable by a computer system to perform the method of screening pivot cartridges and pin-pointing the causes of defects. In addition, the invention also can be implemented as a testing apparatus.

These and various other features as well as advantages which characterize the present invention will be apparent upon reading of the following detailed description and review of the associated drawings.

DETAILED DESCRIPTION

Figure 1:
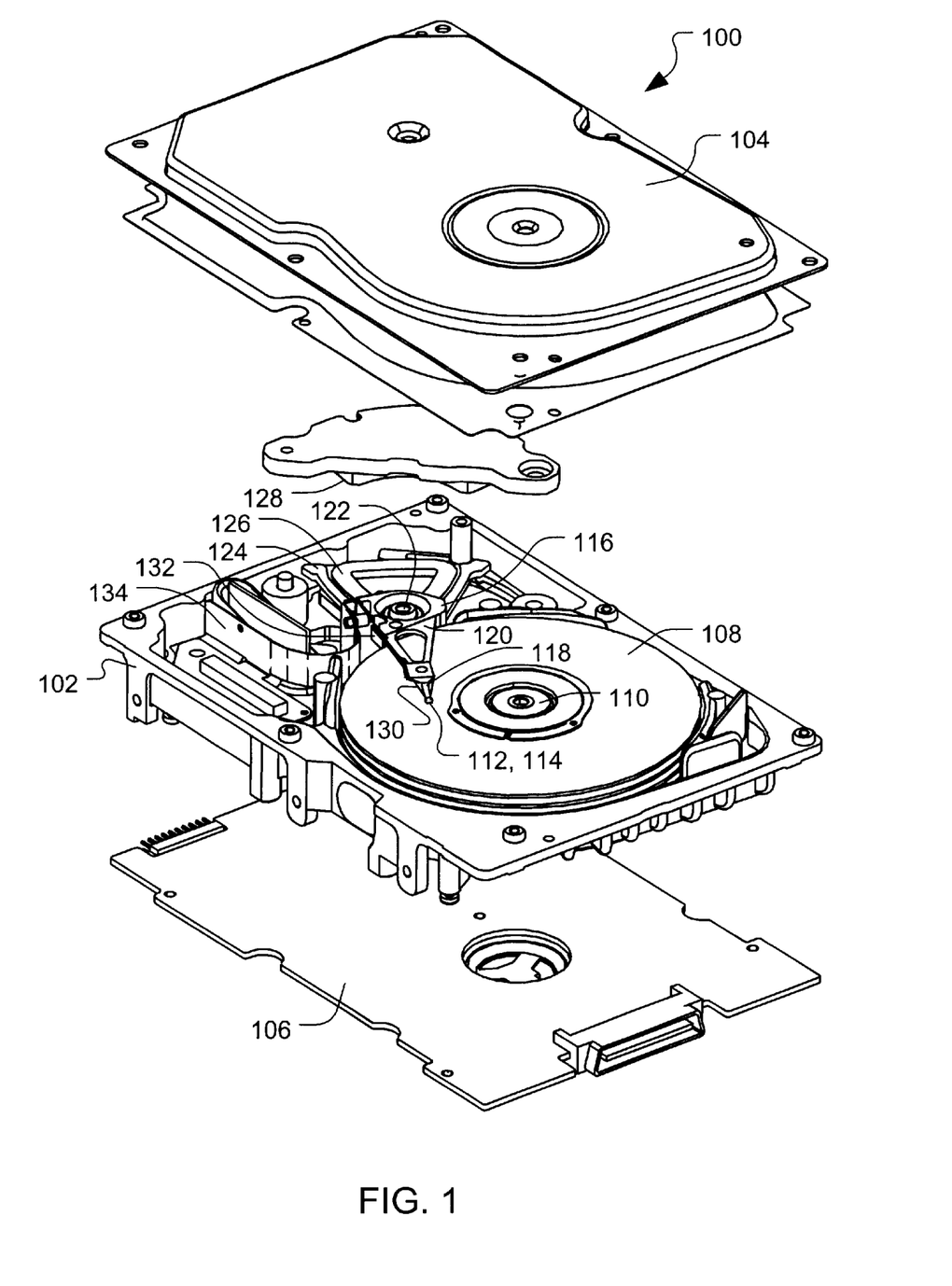
FIG. 1 shows a disc drive.

Preferred embodiments of the invention are described below with reference to the drawings. FIG. 1 shows an exemplary disc drive 100 having an enclosure formed by a baseplate 102 and a cover 104. Disc drive operations are controlled by the circuitry on a printed circuit board assembly 106 usually mounted to the baseplate 102, outside the enclosure. Within the enclosure, discs 108 are mounted for co-axial rotation on a spindle motor 110. Corresponding to each disc surface is a writer head 112 that can be electrically excited to generate a magnetic field for recording data onto the spinning disc surface. A reader head 114 is similarly provided for each disc surface so that data can be retrieved from the disc surface and converted to electrical signals to be carried to the controller of the printed circuit board assembly 106, and eventually to the host system.

An E-block 116 serves to support and move the reader/writer heads 112, 114 with respect to the disc surfaces. The reader/writer heads 112, 114 are supported at one end of a flexure 118, the other end of which is secured to an actuator 120. The actuator 120 includes a pivot cartridge 122 that includes a shaft 148 for mounting to the baseplate 102 of a disc drive 100. The actuator 120 includes a yoke 124 to which a voice coil 126 is attached. When the E-block 116 is assembled in a disc drive 100, the voice coil 126 is typically located adjacent a permanent magnet 128. By controlling the current that flows through the voice coil 126, controlled rotation of the actuator 120 and thereby the positioning of the reader/writer heads 112, 114 can be achieved.

In a read operation, the relevant reader head 112 senses the data recorded on the corresponding disc surface and converts the sensed data into electrical signals. The electrical signals are carried from the reader head 112 by a wire or printed circuit 130 attached to the flexure 118 to a preamplifier 132 usually located on the E-block 116. The signals are eventually passed to the controller of the printed circuit board assembly 106 by a printed circuit cable 134.

Figure 2:
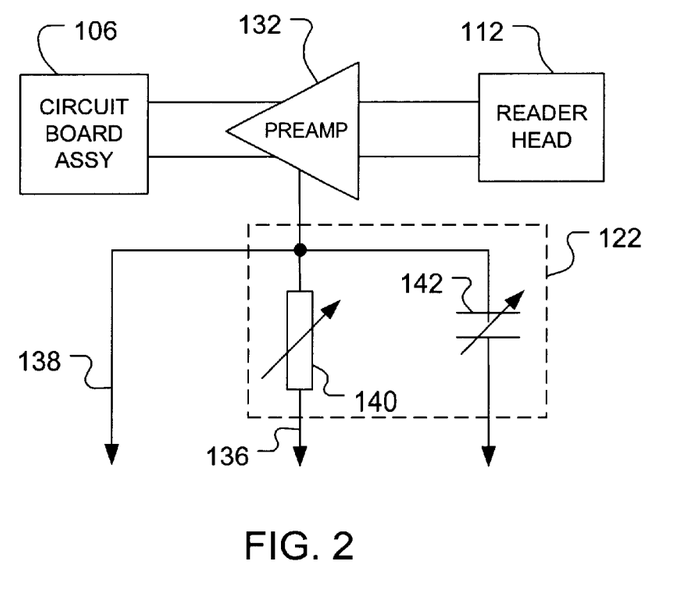
FIG. 2 is a diagrammatic representation of a grounding arrangement for a preamplifier mounted on the E-block.

It is conventional to ignore the pivot cartridge 122 when devising systems for increasing the bit error rate (BER) and improving the signal-to-noise ratio (SNR) in a disc drive 100. However, according to the present invention, it is proposed that noise is introduced to the read/write signals by the pivot cartridge 122. It follows that the grounding of the E-block 116 may be depicted by FIG. 2. The baseplate 102 of the disc drive 102 is taken to be the system ground 136, but the ground 138 of the printed circuit cable 134 is connected to system ground 136 via the pivot cartridge 122. The pivot cartridge 122 itself is characterized by an impedance value which for the sake of analysis is sometimes broken down into components of resistance 140 and capacitance 142. It is further proposed by the present invention that overall disc drive performance, as characterized by the BER and SNR, may be improved by selecting pivot cartridges which by themselves have good performance characteristics.

Figure 3:
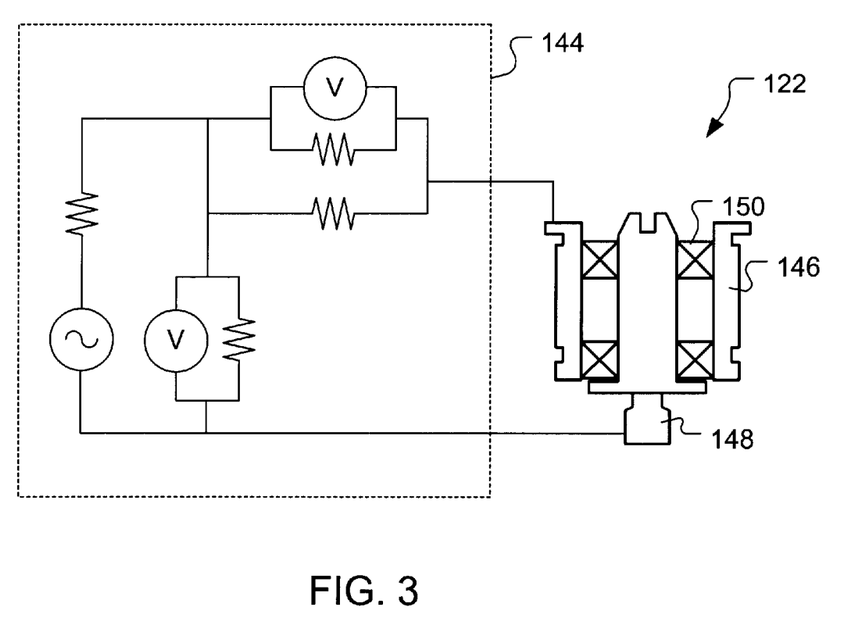
FIG. 3 is a circuit diagram showing a preferred set-up for taking impedance readings of a pivot cartridge.

The present invention involves assessing the impedance of the pivot cartridge 122 through a simple circuit, such as one shown in FIG. 3. A commercially available impedance analyzer 144, for example, HP4396B from Hewlett Packard can be used to obtain the impedance readings. As the pre-amplifier 132 is usually mounted to the side of the actuator 120 which in turn is attached to the sleeve 146 of the pivot cartridge 122, the impedance analyzer 144 is preferably connected for reading across from the sleeve 146 to the shaft 148. The sleeve 146 is rotatably mounted to the shaft 148 via bearings 150.

Figure 4:
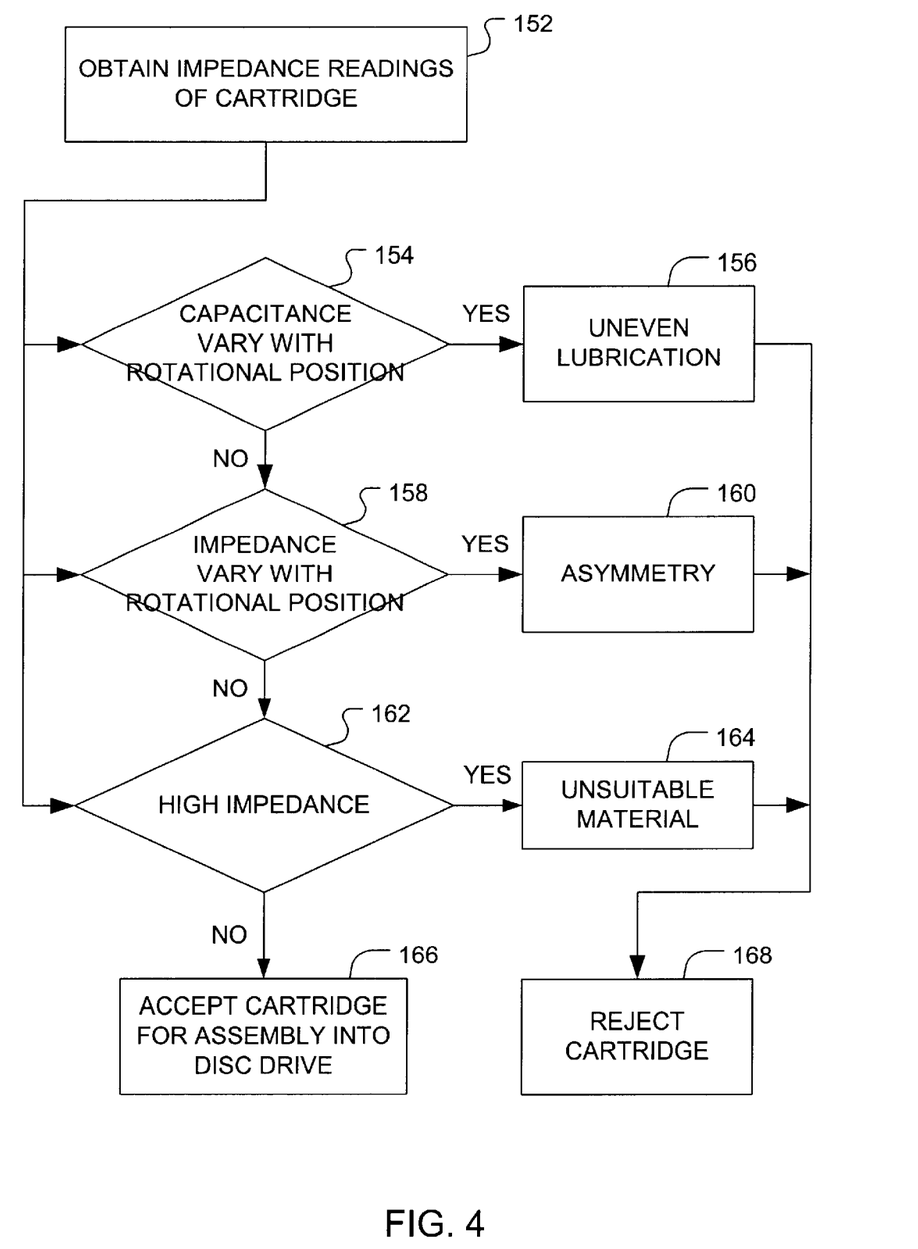
FIG. 4 illustrates a preferred process for screening and identifying causes of defective pivot cartridges.

The flowchart of FIG. 4 illustrates one preferred embodiment of a method of screening pivot cartridges. Impedance readings of a pivot cartridge is taken across a frequency spectrum for different rotational positions of the pivot cartridge, as shown in step 152. If the capacitance component of the impedance shows variation for different rotational positions 154, the lubrication around the ball bearings is likely to be uneven 156. A threshold may be set for the extent of variation so that variation larger than the threshold leads to a decision to reject the pivot cartridge. It may be that the capacitance variation is within acceptable limits but the impedance or the resistance portion varies with rotational position beyond a predetermined threshold 158. Such variation suggests some asymmetry in the construction of the pivot cartridge 160. For example, the conductivity of different ball bearings in the pivot cartridge differs significantly. Another likely defect is uneven degree of contact between the ball bearings and races. If the impedance of the pivot cartridge is high 162, the likely cause is that the material used for the fabrication of the pivot cartridge is unsuitable 164. If the impedance readings of the pivot cartridge are within the thresholds and are fairly uniform for different rotational positions, this leads to a decision to accept the pivot cartridge for assembly in a disc drive 166. Where the pivot cartridge is found not to meet the predetermined criteria, it is rejected and not assembled to the disc drive 168. The various thresholds for electrical properties and limits for variation may be derived for a given disc drive model by taking readings of pivot cartridges of disc drives with known good BER and SNR characteristics.

Figure 5:
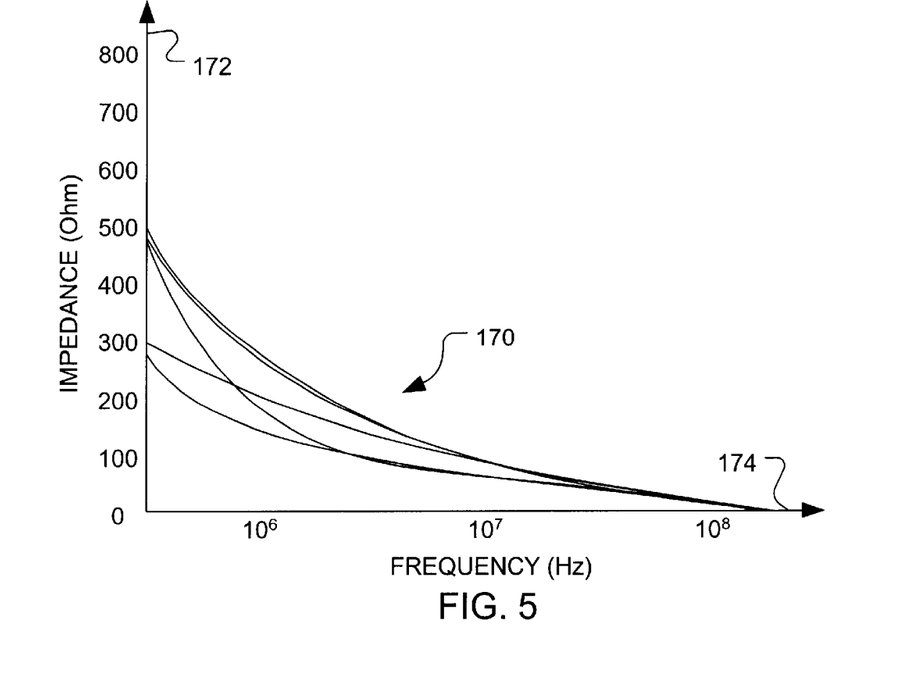
FIG. 5 is a plot of impedance against frequency for a pivot cartridge A.
Figure 6:
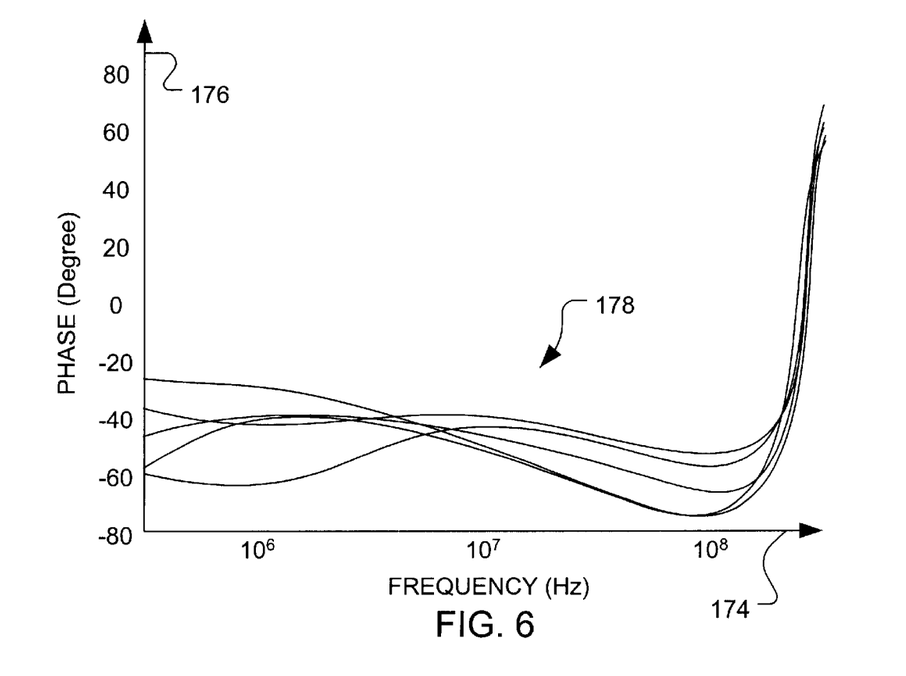
FIG. 6 is a plot of the phase associated with impedance readings of FIG. 5.
Figure 7:
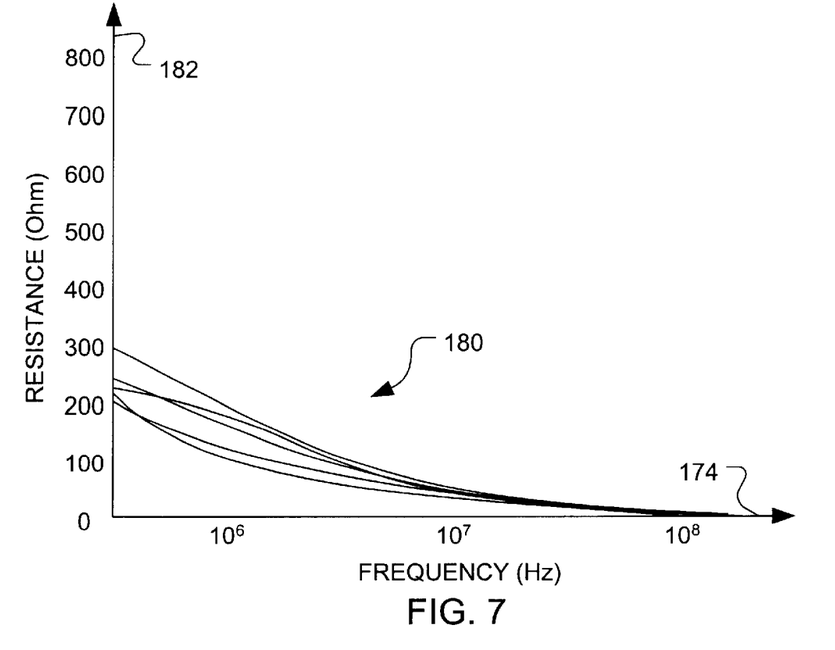
FIG. 7 is a plot of resistance against frequency for the pivot cartridge A.
Figure 8:
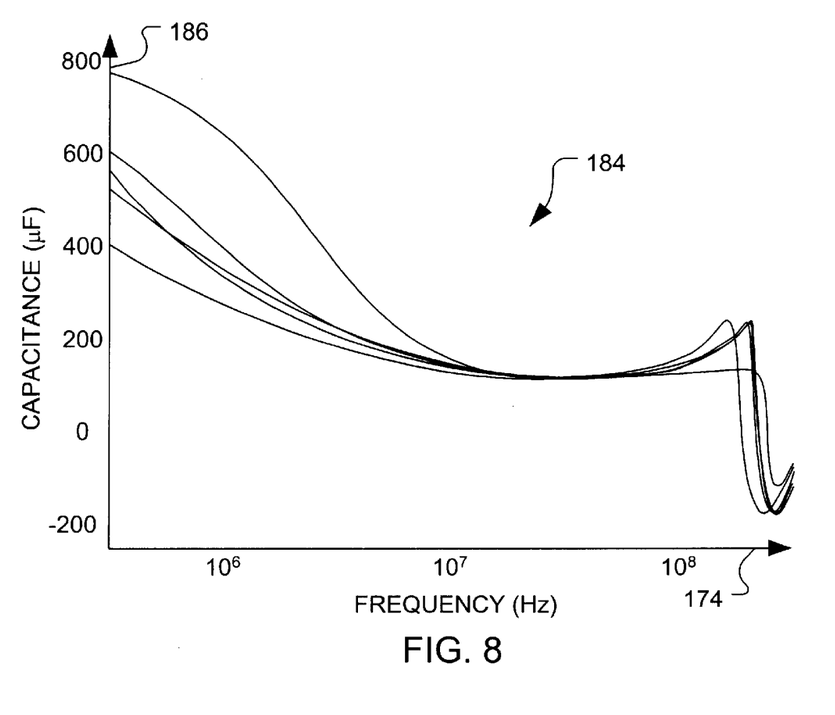
FIG. 8 is a plot of capacitance against frequency for the pivot cartridge A.

A method of assessing the pivot cartridges with respect to their potential contribution to disc drive performance is further explained with the aid of the following examples. The electrical characteristics of a pivot cartridge A is shown in FIGS. 5 to 8. FIG. 5 shows plots 170 of impedance 172 against frequency 174 with readings taken at different rotational positions of the pivot cartridge A. In the critical low frequency zone between 500 kilohertz (kHz) and 1 megahertz (MHz), the impedance values do not exceed 600 ohms. This is considered to be indicative of an acceptable pivot cartridge. FIG. 6 shows plots 178 of the phase 176 associated with the impedance readings of FIG. 5, against frequency 174. The impedance analyzer may further provide the impedance readings in the form of plots 180 of resistance 182 against frequency 174, as depicted in FIG. 7, and in the form of plots 184 of capacitance 186 against frequency 174, as depicted in FIG. 8. In the example of pivot cartridge A, the resistance at low frequencies is acceptably low such that the grounding of the printed circuit cable is not too adversely affected. The capacitance plot 184 of FIG. 8 shows relatively similar behavior for different rotational positions. The plots of FIGS. 5 to 8 are therefore generally indicative of an acceptable pivot cartridge.

Figure 9:
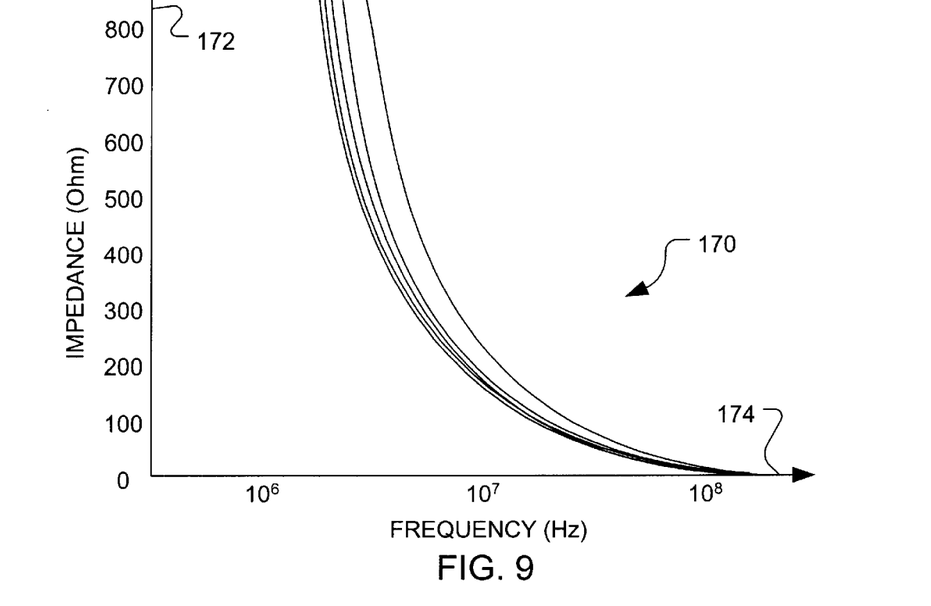
FIG. 9 is a plot of impedance against frequency for a pivot cartridge B.
Figure 10:
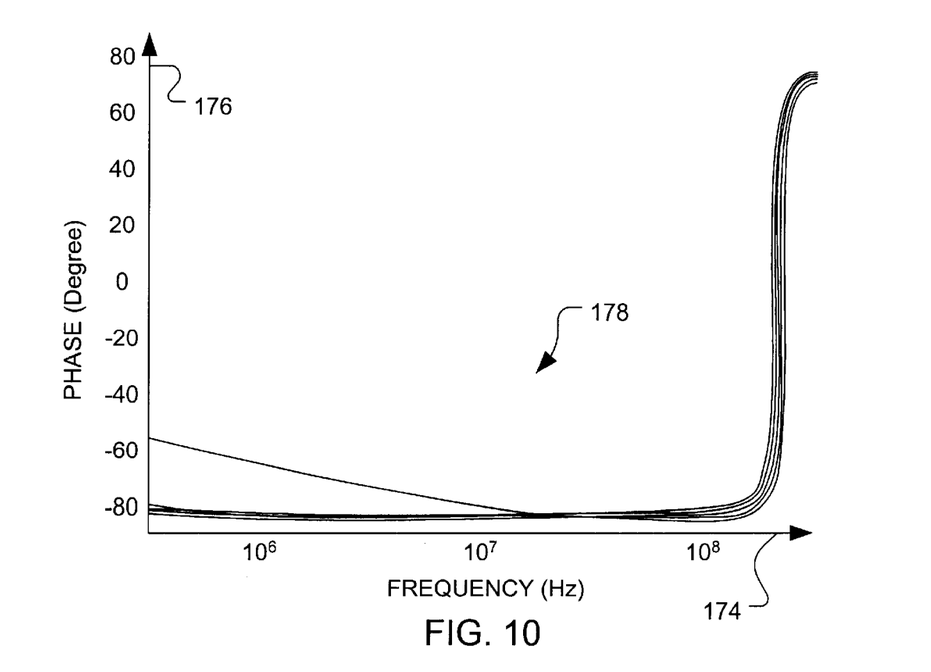
FIG. 10 is a plot of the phase associated with impedance readings of FIG. 9.
Figure 11:
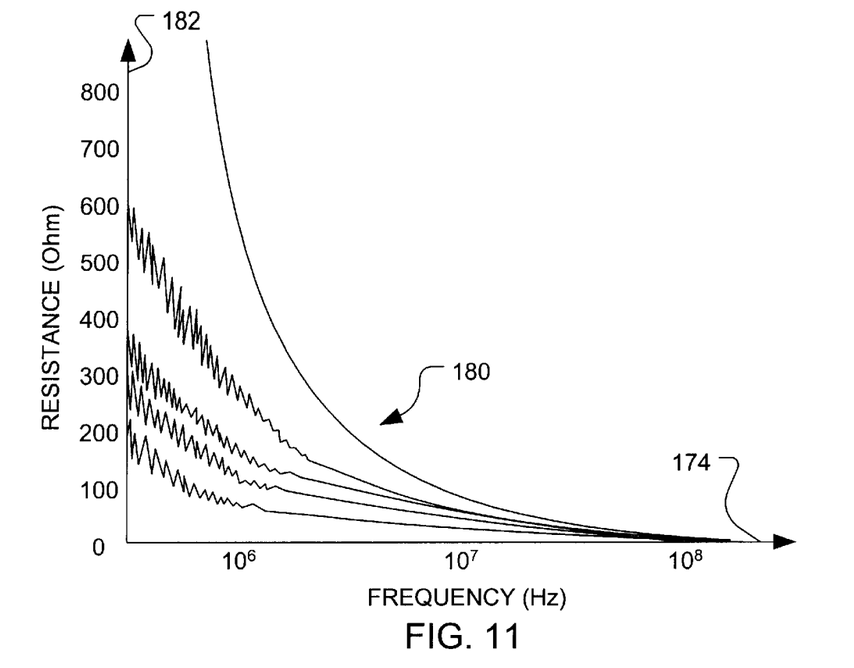
FIG. 11 is a plot of resistance against frequency for the pivot cartridge B.
Figure 12:
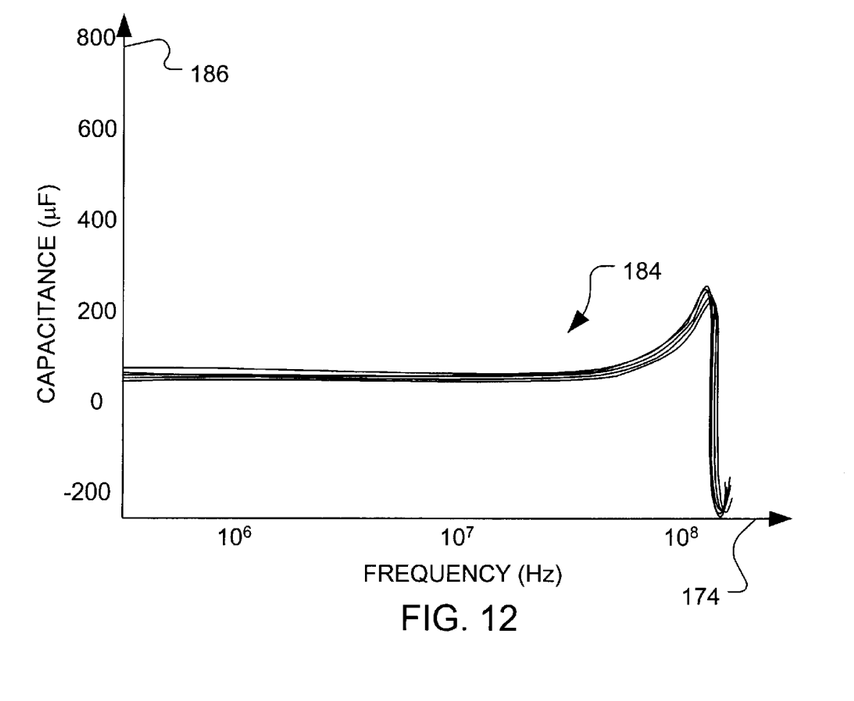
FIG. 12 is a plot of capacitance against frequency for the pivot cartridge B.

The electrical characteristics of a pivot cartridge B is shown in FIGS. 9 to 12. FIG. 9 shows plots 170 of impedance 172 against frequency 174 with readings taken at different rotational positions of the pivot cartridge B. At low frequencies, the impedance values exceed 600 ohms. This is considered to be indicative of a pivot cartridge that will contribute to poor grounding of the printed circuit cable, and consequently to bad signal-to-noise ratios and to unacceptable bit error rates. FIG. 10 shows plots 178 of the phase 176 associated with the impedance readings of FIG. 9, against frequency 174. Referring to FIG. 11 for the plots 180 of resistance 182 against frequency 174, it can be seen that the resistance at low frequencies is higher than the threshold of 600 ohms. The plots 184 of capacitance 186 against frequency 174 as depicted in FIG. 12 show relatively similar behavior for the various rotational positions. These plots are indicative that the defect in the pivot cartridge B lies in the materials used. In this manner, the method of screening as proposed by the present invention also provides an indication of the causes of defects in the pivot cartridge. This information can be helpful in improving the overall quality of the disc drives produced because suppliers can be duly alerted to specific defects in the pivot cartridges.

Figure 13:
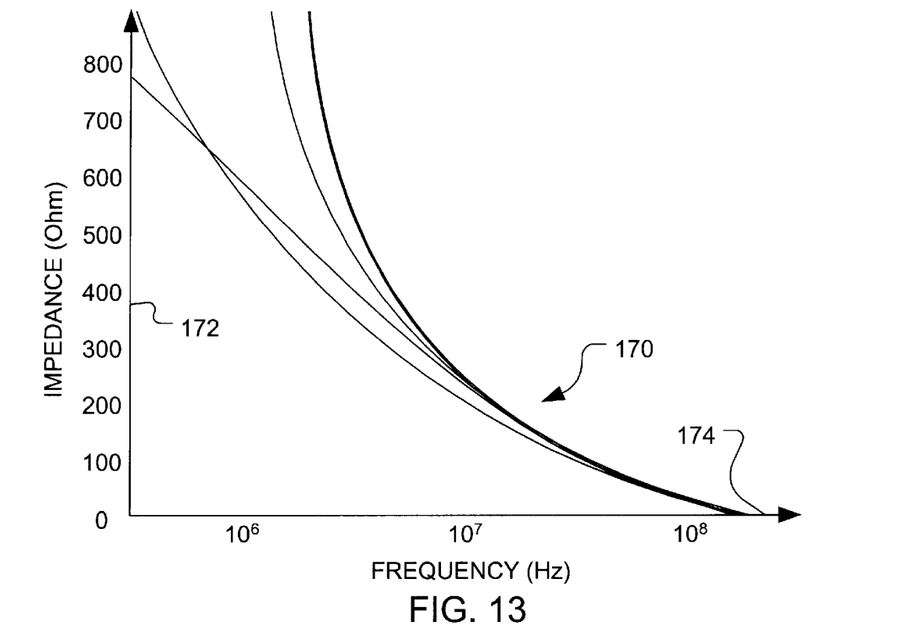
FIG. 13 is a plot of impedance against frequency for a pivot cartridge C.
Figure 14:
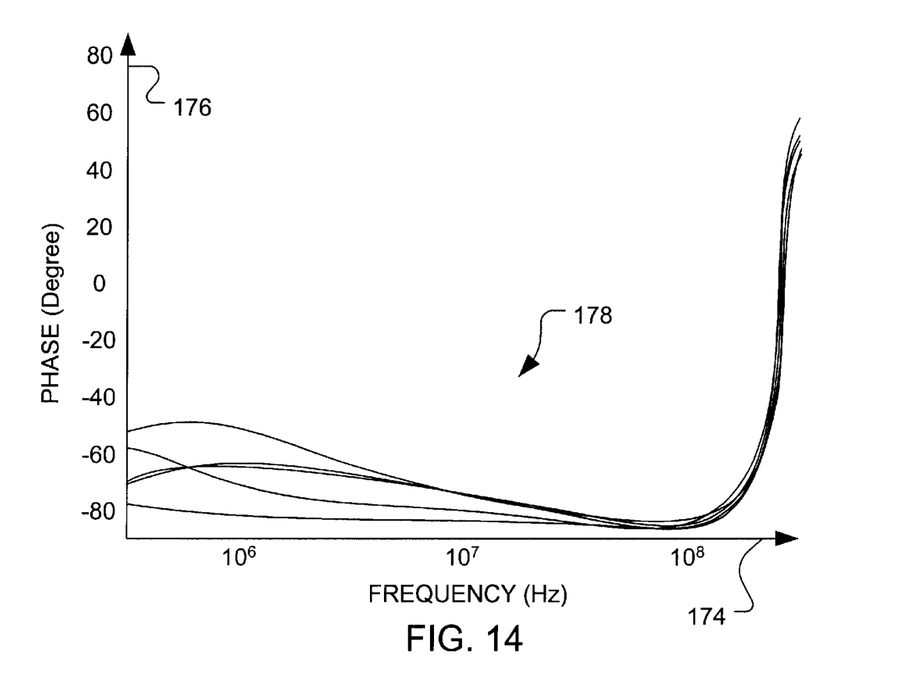
FIG. 14 is a plot of the phase associated with the impedance readings.
Figure 15:
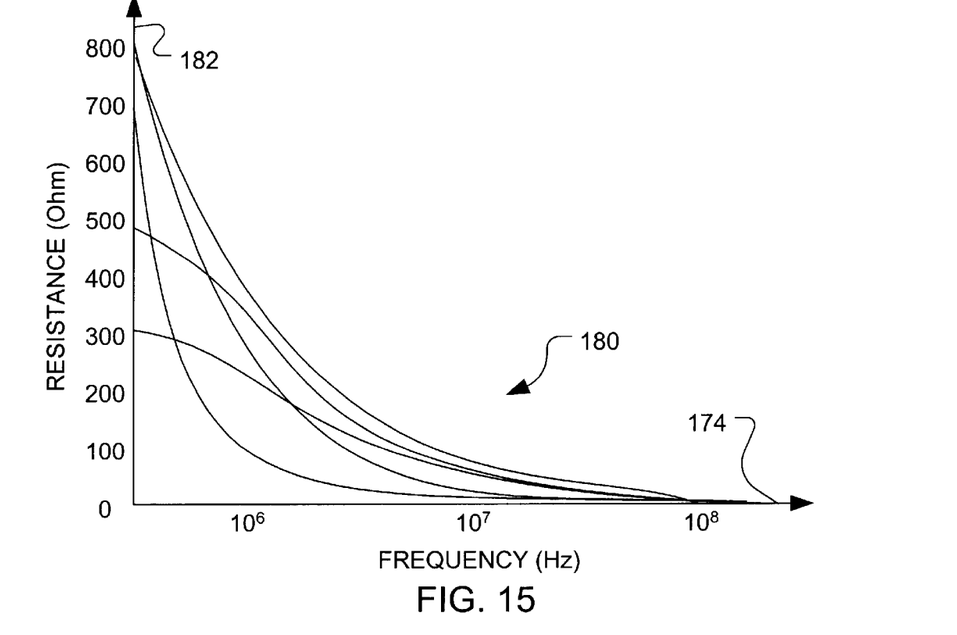
FIG. 15 is a plot of resistance against frequency for the pivot cartridge C.
Figure 16:
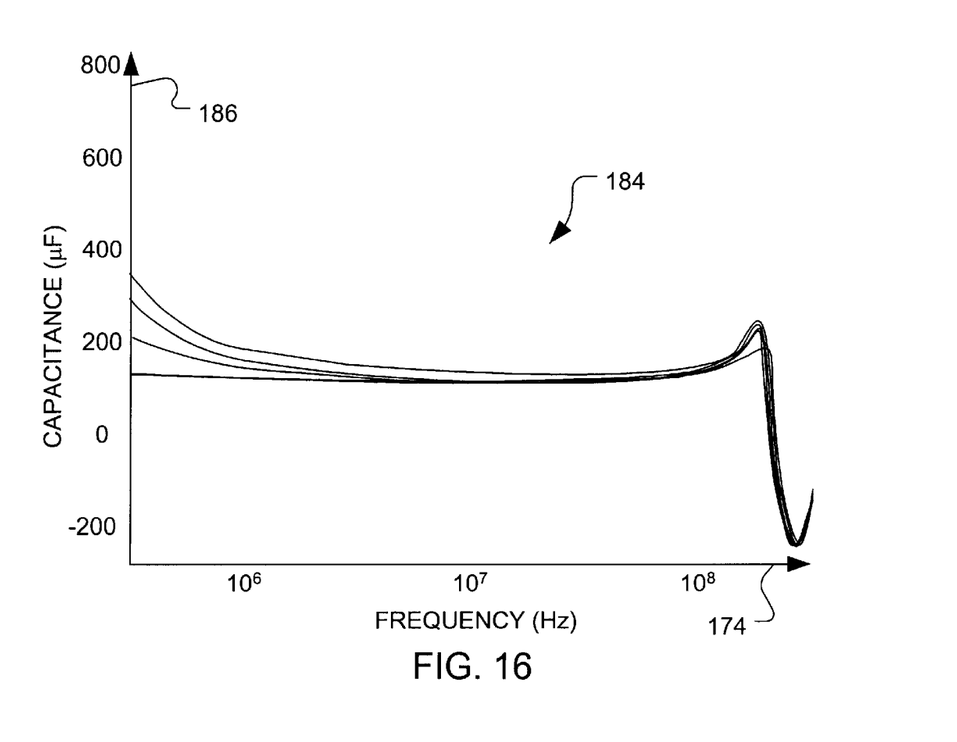
FIG. 16 is a plot of capacitance against frequency for the pivot cartridge C.

FIG. 13 shows plots 170 of impedance 172 against frequency 174 for a pivot cartridge C. The impedance values are over 600 ohms in the low frequency region and thus indicates a pivot cartridge that should be rejected. FIG. 14 shows plots 178 of the phase 176 associated with the impedance readings of FIG. 13, against frequency 174. Further information can be gathered from FIG. 15 which depicts the plots 180 of resistance 182 against frequency 174. The plots show relatively larger variation between different rotational positions, as compared to resistance-frequency plots for pivot cartridges A and B. In FIG. 16, the plots 184 of capacitance 186 against frequency 174 for pivot cartridge C shows relatively similar behavior for the various rotational positions. This points to the pivot cartridge C having asymmetrical properties, for example, some of the ball bearings have poorer contact or some of the ball bearings have poorer conductivity. Such variation is undesirable as it causes the grounding of the printed circuit cable to be changed for different rotational positions.

Figure 17:
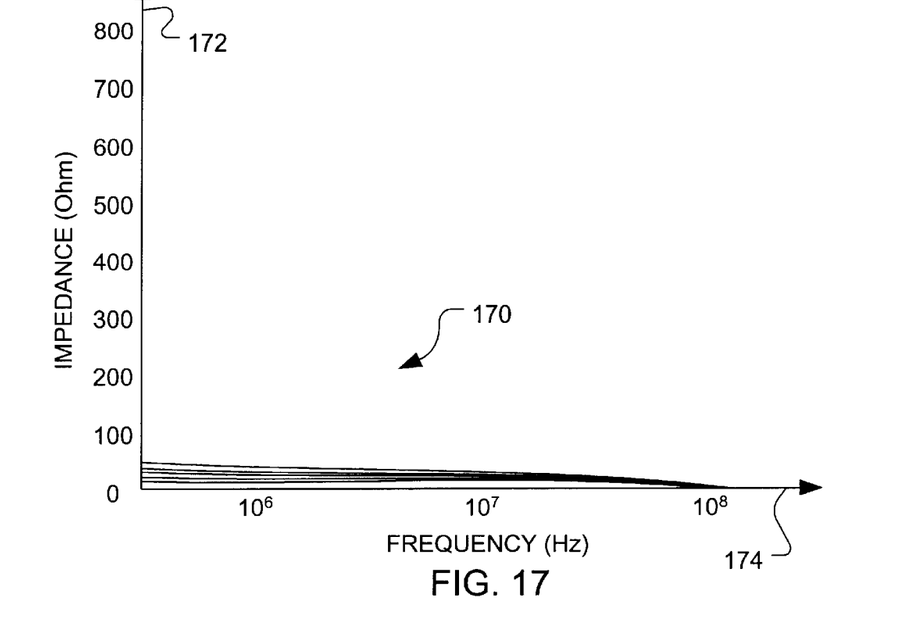
FIG. 17 is a plot of impedance against frequency for a pivot cartridge D.
Figure 18:
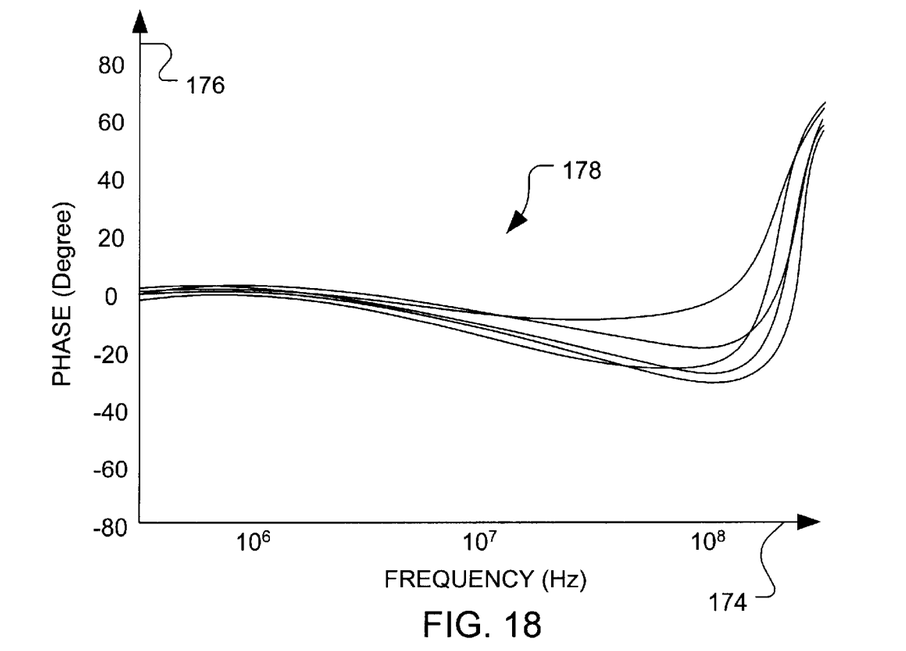
FIG. 18 is a plot of the phase associated with the impedance readings.
Figure 19:
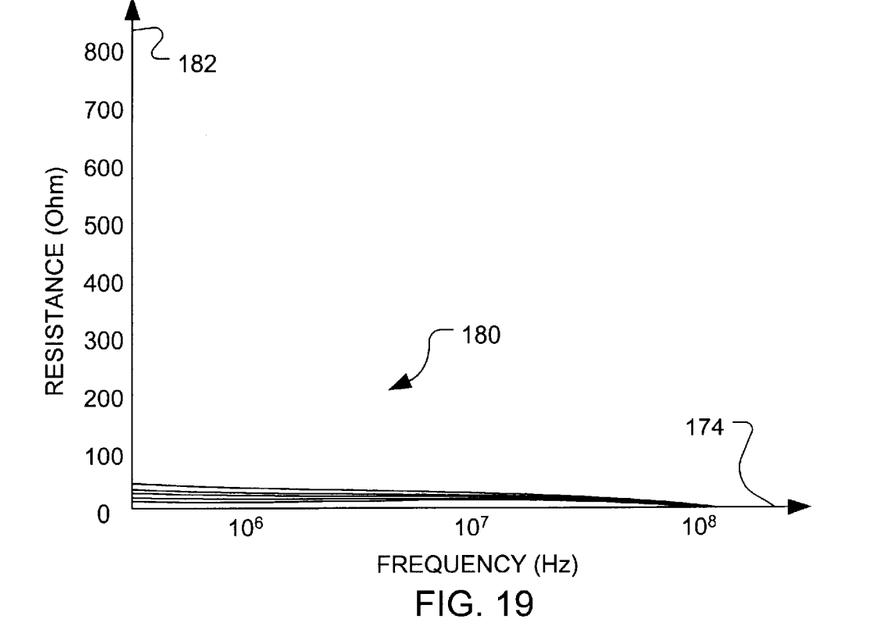
FIG. 19 is a plot of resistance against frequency for the pivot cartridge D.
Figure 20:
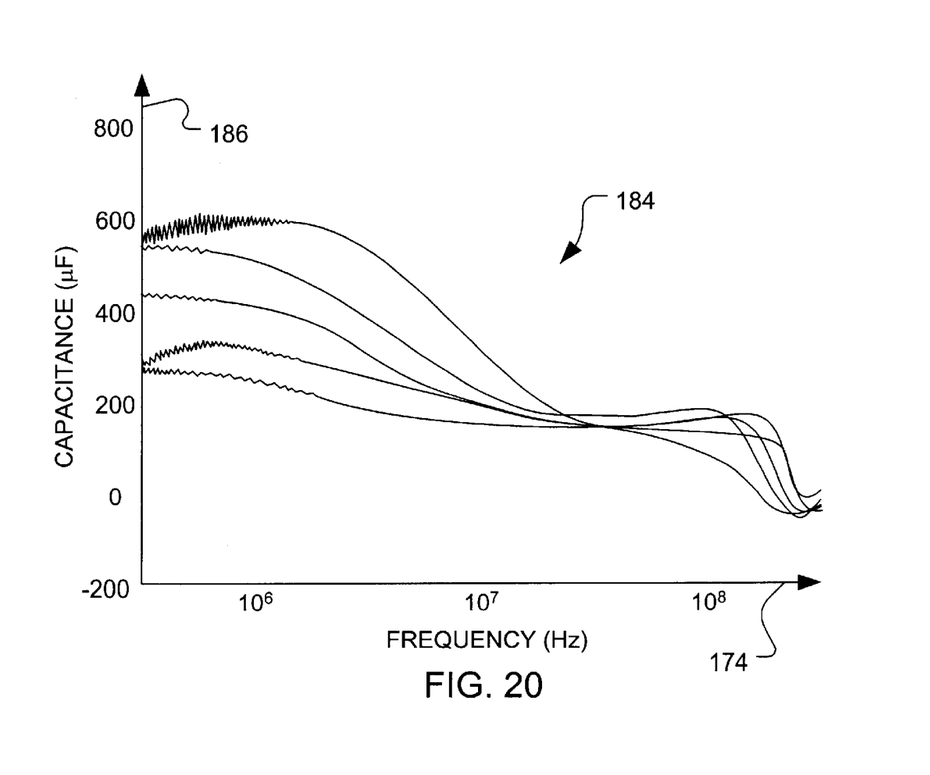
FIG. 20 is a plot of capacitance against frequency for the pivot cartridge D.

Another example is described with reference to FIGS. 17 to 20. FIG. 17 shows the impedance 172 against frequency 174 plots 170 for a pivot cartridge D and FIG. 18 shows the corresponding plots 178 for phase 176 against frequency 174. The plots 180 of resistance 182 against frequency 174 for the pivot cartridge is shown in FIG. 19. As can be seen, the pivot cartridge has low resistance even in the critical low frequency zone. However, FIG. 20 shows large variations in the capacitance 186 against frequency 174 plots 184 for different rotational positions. The plots are indicative of a pivot cartridge in which lubricating grease is unevenly distributed in the ball bearings.

As the impedance readings of a pivot cartridge is taken and analyzed before the pivot cartridge is assembled or mounted in the disc drive, the disc drive manufacturer is able to screen out cartridges which are likely to contribute to bad SNR and BER at an early stage of manufacture.

Alternatively, embodiments of the present invention may be described as follows:

A method of manufacturing a disc drive 100 includes obtaining impedance measurements 170 of a pivot cartridge 122 at different frequencies and at different rotational positions 152. If the impedance measurements 170 meet at least one criterion, the pivot cartridge 122 is rejected 168 for assembly into the disc drive 100.

The method may involve obtaining resistance measurements 180 of the pivot cartridge 122. If the resistance measurements 180 meet predetermined criteria, the pivot cartridge 122 is rejected 168 for assembly into the disc drive 100. Preferably, the resistance measurements 180 are extracted from the impedance measurements 170. In a most preferred embodiment, the pivot cartridge 122 is rejected 168 if the resistance measurements are more than 600 ohms. The pivot cartridge 122 may be rejected if plots of the resistance measurements 180 vary above a predetermined extent for different rotational positions at the same frequency.

The method of manufacturing a disc drive 100 may involve obtaining capacitance measurements 180 of the pivot cartridge 122 and rejecting 168 the pivot cartridge 122 for assembly into the disc drive 100 if the capacitance measurements 184 meet predetermined criteria. Preferably, the capacitance measurements 184 are extracted from the impedance measurements 170. In a most preferred embodiment, the pivot cartridge 122 is rejected 168 if the capacitance measurements 184 are more than 600 ohms. The pivot cartridge 122 may be rejected 168 if plots of capacitance measurements 184 vary above a predetermined extent for different rotational positions at the same frequency.

The present invention may be in the form of a computer-readable program storage device carrying a program of instructions executable by a computer system to perform a method of screening pivot cartridges 122 and pin-pointing causes of defects. The method involves testing for electrical properties of a pivot cartridge 122 before mounting the pivot cartridge 122 in the disc drive 100. The method also includes identifying defects in the pivot cartridge 122 from the electrical properties. The electrical properties are such that may influence the bits error rate characteristics of the disc drive 100 if the pivot cartridge 122 is mounted to the disc drive 100.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular criteria set may vary depending on the particular application for the disc drive while maintaining substantially the same functionality without departing from the scope and spirit of the present invention. In addition, although the preferred embodiment described herein is directed to pivot cartridge for use in a rotational actuator that is part of a disc drive system, it will be appreciated by those skilled in the art that the teachings of the present invention can be applied to other actuator systems for a disc drive without departing from the scope and spirit of the present invention.

What is claimed is:

1. A method of manufacturing a data storage device, the data storage device having an actuator operably moving a data transfer member relative to a data storage surface, the actuator pivoting around a pivot cartridge having a stationary shaft and a sleeve journalled to the stationary shaft by a bearing interposed therebetween, the method comprising steps of:
   (a) obtaining electrical impedance measurements between the shaft and the sleeve of the pivot cartridge at different frequencies and at different rotational positions; and
   (b) accepting the pivot cartridge for assembly into the data storage device if the impedance measurements meet at least one criterion and rejecting the pivot cartridge if the impedance measurements do not meet the criterion.

2. The method of manufacturing a data storage device according to claim 1, the method further comprising steps of:
   (c) obtaining resistance measurements of the pivot cartridge; and
   (d) accepting the pivot cartridge for assembly into the data storage device if the resistance measurements meet at least a predetermined criterion and rejecting the pivot cartridge if the resistance measurements do not meet the criterion.

3. The method of manufacturing a data storage device according to claim 2 wherein the obtaining step (c) includes extracting the resistance measurements from the impedance measurements.

4. The method of manufacturing a data storage device according to claim 3 wherein the step (d) includes a step of rejecting the pivot cartridge if the resistance measurements are more than 600 ohms.

5. The method of manufacturing a data storage device according to claim 3 wherein the step (d) includes a step of rejecting the pivot cartridge if plots of resistance measurements vary for different rotational positions at the same frequency.

6. The method of manufacturing a data storage device according to claim 1, the method further comprising steps of:

(e) obtaining capacitance measurements of the pivot cartridge; and (f) accepting the pivot cartridge for assembly into the data storage device if the capacitance measurements meet a predetermined criterion and rejecting the pivot cartridge if the capacitance measurements do not meet the criterion.

7. The method of manufacturing a data storage device according to claim 6 wherein the obtaining step (e) includes extracting the capacitance measurements from the impedance measurements.

8. The method of manufacturing a data storage device according to claim 6 wherein the step (f) includes a step of rejecting the pivot cartridge if the capacitance measurements are more than 600 ohms.

9. The method of manufacturing a data storage device according to claim 6 wherein the step (f) includes a step of rejecting the pivot cartridge if plots of capacitance measurements vary for different rotational positions at the same frequency.

10. A computer-readable program storage device tangibly embodying a program of instructions executable by a computer system to perform a method of screening pivot cartridges and pin-pointing causes of defects before using the pivot cartridges in a data storage device, each pivot cartridge having a stationary shaft and a sleeve journalled to the stationary shaft by a bearing interposed therebetween, the method comprising steps of:

testing for electrical properties of the pivot cartridge between the shaft and the sleeve before mounting the pivot cartridge in the data storage device; and identifying defects in the pivot cartridge from the electrical properties, wherein the electrical properties indicate the bit error rate characteristics of the data storage device using the respective pivot cartridge.

11. A system for making a data storage device, the system comprising:

a tester for a pivot cartridge in the data storage device, the pivot cartridge having a stationary shaft and a sleeve journalled to the shaft by a bearing interposed therebetween, the tester adapted for determining the electrical properties between the shaft and the sleeve; and means for identifying defects in the pivot cartridge from the electrical properties, wherein the electrical properties indicate the bit error rate characteristics of the data storage device using the respective pivot cartridge.

* * * * *